(12) United States Patent
Katzenelson et al.

(10) Patent No.: US 6,553,504 B1
(45) Date of Patent: Apr. 22, 2003

(54) CLOCK SYNCHRONIZATION OF MULTIPROCESSOR SYSTEMS

(76) Inventors: Jacob Katzenelson, 124 Hagalil Street, Haifa 32683 (IL); Doron Moshe Erez, 5/31 Hadekel Street, Neve-Savyon 60407 (IL)

( * ) Notice: Subject to any disclaimer, the term of this patent is extended or adjusted under 35 U.S.C. 154(b) by 0 days.

(21) Appl. No.: 09/487,791

(22) Filed: Jan. 20, 2000

Related U.S. Application Data (63) Continuation-in-part of application No. 09/036,136, filed on Mar. 6, 1998, now abandoned, and a continuation-in-part of application No. 09/036,133, filed on Mar. 6, 1998, now abandoned.

(30) Foreign Application Priority Data

Mar. 9, 1997 (IL) .................................................. 120396
Mar. 9, 1997 (IL) .................................................. 120397

(51) Int. Cl.$^7$ ............................................... G06F 1/04
(52) U.S. Cl. ....................................... 713/401; 713/503
(58) Field of Search ................................ 713/400, 401, 713/500, 501, 503, 600; 375/371, 375

(56) References Cited

U.S. PATENT DOCUMENTS

| | | | |
|---|---|---|---|
| 4,411,007 A | | 10/1983 | Rodman et al. |
| 5,293,626 A | * | 3/1994 | Priest et al. ................. 713/401 |
| 5,329,188 A | * | 7/1994 | Sikkink et al. ............... 327/18 |
| 5,387,885 A | | 2/1995 | Chi |
| 5,764,092 A | * | 6/1998 | Wada et al. ................. 327/271 |
| 5,842,001 A | * | 11/1998 | Kubota ........................ 713/400 |

OTHER PUBLICATIONS

Katzenelson, J. et al.; "The Supercomputer Toolkit and Its Applications"; International Journal of High Speed Electronics and Systems; vol. 9; No. 3; pp. 807–846; 1999.

Johnson, M. G. et al.; "A Variable Delay Line PLL for CPU–Coprocessor Synchronization"; IEEE Journal of Solid–State Circuits; vol. 23; No. 5; Oct. 1988.

Abelson, H. et al.; "The Supercomputer Toolkit: A general framework for special–purpose computing"; International Journal of High Speed Electronics; vol. 3; Nos. 3 and 4; pp. 337–361; 1992.

* cited by examiner

*Primary Examiner*—Dennis M. Butler
(74) *Attorney, Agent, or Firm*—Fenster & Company (57) ABSTRACT

A method of synchronizing a general network of processors, which network may contain loops, the method comprising:
  (a) providing clock signals at each of the processors, said clock signals having a common frequency;
  (b) measuring the phase between clock signals of different processors at the processors; and
  (c) adjusting the phase of the clock signals to produce local clock signals at each processor by varying the phases of the clock signals of individual ones of the processors, responsive to the measurements, such that phase differences between the clock signals of adjacent processors are less than a predetermined value δ, wherein such adjustment is controlled by at least one computer.

23 Claims, 11 Drawing Sheets

CLOCK SYNCHRONIZATION OF MULTIPROCESSOR SYSTEMS

RELATED APPLICATIONS

This application is a continuation in part of both U.S. patent application Ser. Nos. 09/036,133 and 09/036,136 of the same inventors, both now abandoned, both of which were filed on Mar. 6, 1998 and both of which are incorporated herein by reference.

FIELD OF THE INVENTION

The present invention is concerned with multiprocessor system in which the processors operate together to perform coordinated calculations; more specifically, the present invention is concerned with methods and apparatus for clock synchronization among the processors.

BACKGROUND OF THE INVENTION

A system called the Supercomputer Toolkit is known in the art and in the literature. Reference is made to H. Abelson, et al., "The Supercomputer Toolkit: A general framework for special-purpose computing," International Journal of High Speed Electronics, Vol. 3, Nos. 3 and 4, pp 337–361, 1992, and J. Katzenelson, et al., "The Supercomputer Toolkit and Its Applications," EE Memo 1165, Department of Electrical Engineering, Technion, June 1998.

The Supercomputer Toolkit is a family of hardware and software modules from which high-performance special-purpose computers for scientific/engineering use can be easily constructed and programmed. The hardware modules include processors, memory, I/O and communication devices; the software modules include an operating system, compilers, debuggers, simulators, scientific libraries, and high-level front ends.

The following example illustrates the use of the Supercomputer Toolkit. When faced with a suitable problem, the engineer/scientist connects the modules by means of static-interconnect technology (ribbon cables) and constructs a parallel computation network. The network is loaded from a workstation that serves as a host. The program is run; the results are collected and displayed by the host. The host handles files, does compilation, etc. The computation network, the hardware portion of the Toolkit, does the heavy computation.

An interesting and important characteristics of the Toolkit's parallel computation network is its high-speed communication links. In general, the Toolkit comprises a plurality, often very many processor boards. Each of the links connects between two or more processor boards. The computation network can be viewed as a graph where the nodes (vertices) are processors (each processor is a board) and the branches (arcs) are the high-speed links. This structure is described, for example in the second reference cited above. This reference reports maximum communication rate of 0.5 Gigabit per second per link (or per processor port) and claims that with better design the maximum rate per link is the rate in which data can be retrieved/stored from/in memory.

The high speed of the communication is based on the synchronization of all processors in the computation networks. This synchronization means the following:

a. The clocks of all processors have the same frequency. This is referred to herein as "frequency sychronization".

b. The phase difference between the clocks of an two neighbors is less than a certain amount called δ, which is the tolerance or the phase difference that allows bidirectional synchronous communication between adjacent neighbors. This condition is referred to herein as "phase synchronization".

c. The instructions of all neighbors have to be synchronized in the sense that if a processor sends data to a second processor to which it is connected (and phase synchronized) by a 'write' instruction, a 'read' instruction has to appear in the second processor's program at the exactly the right place that enables reading the information sent to it. This condition is referred to herein as "instruction synchronization."

Two Toolkit systems have been implemented and published. One of these, referred to herein as the "MIT Toolkit" is described in the above referenced Abelson et al. reference; the other is referred to herein as the "Technion Toolkit" is described in the Katzenelson, et al. reference.

The two Toolkit systems implemented frequency synchronization by having one clock generator whose signal is distributed to all processor boards. Phase synchronization was achieved by hand trimming of the length of the wire that distributes the clock. Instructional synchronization was achieved somewhat differently in MIT Toolkit and the Technion Toolkit. The MIT Toolkit has data independent instructions (i.e., the time required to carry out an instruction is independent of the data) and therefore, if all processors are started together they remain synchronized. The Technion Toolkit relied on a synchronization line, as described in the Abelson, et al., reference. The MIT Toolkit also had a synchronization line that could be used for instruction synchronization. Note that both Toolkit systems are meant to run one program at a time; that program is parallelized and put on all processors. Thus, the support of instructional synchronization is relatively simple for a phase synchronized Toolkit system, while for a general purpose distributed computing system that supports several independent programs at a time the support of instruction synchronization is not straight forward, to say the least.

In the Toolkit systems the processors are inter alia arranged in a general network, i.e., which may include a series of ring or loop configurations. In this manner these systems different from synchronized systems of the prior art, in which a tree structure is utilized. In such tree structure systems, the synchronization between one processor and a second adjacent processor is relatively independent of the synchronization of the adjacent processor and other processors to which it is connected. For loop connected processor systems, the phase synchronization between adjacent processors must be preserved all around the loop. For large or complicated loop systems, the achievement of phase synchronization is difficult to achieve by hand.

One major drawback of the existing synchronous systems is thus seen to be the requirement to hand-trim the clocks to achieve the phase synchronization. Furthermore, this requirement limits the use of the Toolkit to systems in which there is no change in the timing of the clocks or of the transit time between the processors.

Communication engineers are well aware that, given the maximum speed of the clocks, synchronous communication is the best type of connection between processors. In most common communication environments, however, frequency, phase and instruction synchronization cannot always all be satisfied. Therefore, sophisticated asynchronous algorithms have been developed that approach the performance of synchronous communication as the length of the message are increased. These asynchronous methods require instrumentation and/or introduce latency.

SUMMARY OF THE INVENTION

One aspect of some preferred embodiments of the present invention is concerned with a systematic method for providing phase synchronization between clocks of neighbors in a network containing loops. Preferably, the phase synchronization is achieved automatically.

One aspect of some preferred embodiments of the invention is concerned with reducing the phase difference between adjacent processors. If the phase difference between any two processors in the network is within ±T/4 (where T is the period of the clock), a preferred method of the invention reduces the phase difference between any pair of neighbors to less than a desired amount δ. In a preferred embodiment of the invention, this starting point is achieved by increasing T until the condition is met. Preferably, the phase difference is then decreased, and T decreased to a desired clock rate.

When implementable, synchronous communication is both fast and simple. Note that implementing the method depends on the ability to measure phase differences between neighbor processors; that ability requires transmission lines of substantially time-invariant delay. For a Toolkit-like supercomputer, where a few dozens (or few hundreds or more) processors occupy a room, such transmission lines are available and the conditions can be satisfied. Synchronous transmission may be achieved with stable or with slowly varying phase differences. When the phase between processors varies slowly, the system can track the changes and continuously adjust the phase between the clocks. Alternatively, at predetermined intervals or in response to an indication of increased phase difference, the system can be halted and a new synchronization cycle.

The phase difference is preferably reduced by changing the phase of at least some of the processors "locally", defined herein as "at the processor". In a preferred embodiment of the invention, the processor itself performs this command in accordance with a predetermined protocol. The processor may receive commands for making the phase change either from a central computer (which receives measurement data from each processor and sends the processors commands based on the protocol), or from another processor. Alternatively, each processor may decide local on the required phase change.

There is thus provided, in accordance with a preferred embodiment of the invention, a method of synchronizing a general network of processors, which network may contain loops, the method comprising:

(a) providing a clock signal at each of the processors, said clock signals having a common frequency and different phases;

(b) determining the phase between clock signals of different processors at the processors; and (c) adjusting the phase of the clock signals to produce local clock signals at each processor by locally varying the phases of the individual clock signals, responsive to the measurements, such that phase differences between the clock signals of adjacent processors are less than a predetermined value δ.

Preferably, the determination of the phase differences is made by a measurement at the processors. Alternatively it may be determined in other ways.

Preferably, the phases of the individual clock signals for the processors are varied by their associated processors.

Preferably, the clock signal is provided to the processors from a remote clock source via transmission lines of different lengths, such that the phase of the provided clock signals at an input to the processors is different for at least some of the different processors.

Preferably, the phase measurements are transmitted to a computer and wherein the computer determines required phase changes for the processors in accordance with a predetermined protocol.

Preferably, the protocol comprises:

A) determining, for a first processor, whether the phase difference between its local clock and the clocks of all its neighboring processors is greater δ in a same sense when measured at the first processor; and B) stepwise varying the phase at the first processor by an amount less than δ, in a direction to reduce the phase differences, until at least one phase difference between the first processor and a neighbor, measured at the first processor, is less than δ.

C) repeating A) and B) for all the processors.

Preferably, the method includes, after C:

D) determining the processor (i) for which measurements of all the neighboring clocks differ from the local clock in a particular same sense and (ii) which has the most deviations in that direction that are greater than δ;

E) changing the phase by an amount smaller than δ, in an amount to reduce the maximum measured phase difference; and F) repeating D) and E) until all measured phase differences for all the pairs of neighboring processors is less than δ.

Preferably, the computer informs the processors of a required phase change in accordance with the protocol and wherein the processors vary the phase responsive to the informing.

In a preferred embodiment of the invention, the method includes, prior to (a), removing cycle jumps in all loops of the system. Preferably, removing cycle jumps comprises:

(i) choosing a spanning tree of the network, arranged in hierarchical levels;

(ii) adjusting the phase of the clock signals in a first descendant level of the processors to be different from the clock of a root processor of the network by less than a given amount, in a first time sense;

(iii) adjusting the phase of the clocks in a second descendant level of the processors to be different from the clock of their immediate ancestor by less than the given amount in a second time sense opposite from the first sense;

(iv) repeating (ii) and (iii) for succeeding descendant levels of the processors until the end of the tree is reached.

Preferably, the method includes:

prior to (i), reducing the frequency of the clock signal; and subsequent to (iv), returning the frequency of the clock signal to its original value.

Preferably, the first time sense is a lag and the second time sense is a lead. Alternatively, the first time sense is a lead and the second time sense is a lag.

There is further provided, in accordance with a preferred embodiment of the invention, a method of eliminating phase cycle in a loop connected system, the network comprising processors having a clock with at least a variable phase, the method comprising:

(ii) adjusting the phase of the clock signals in a first descendant level of the processors to be different from the clock of a root processor of the network by less than a given amount, in a first time sense;

(iii) adjusting the phase of the clocks in a second descendant level of the processors to be different from the clock of their immediate ancestor by less than the given amount in a second time sense opposite from the first time sense;

(iv) repeating (ii) and (iii) for succeeding descendant levels of the processors until the end of the tree is reached.

Preferably, the method includes, prior to (i):

reducing the frequency of the clock signals.

Preferably, the method includes, after (iv):

(v) measuring the phase between clocks at the processors; and (vi) locally varying the phases of the individual clock signals, responsive to the measurements, such that phase differences between the clock signals are less than a predetermined value.

Preferably, the method includes, after (vi):

(vii) returning the clock signal frequency to its original value.

(viii) performing the method of claim 1.

Preferably, the first time sense is a lag and the second time sense is a lead. Alternatively, the first time sense is a lead and the second time sense is a lag.

There is further provided, in accordance with a referred embodiment of the invention, a method of synchronizing a general network of processors, which network may contain loops, the method comprising:

(a) providing clock signals at each of the processors, said clock signals having a common frequency;

(b) measuring the phase between clock signals of different processors at the processors; and (c) adjusting the phase of the clock signals to produce local clock signals at each processor by varying the phases of the clock signals of individual ones of the processors, responsive to the measurements, such that phase differences between the clock signals of adjacent processors are less than a predetermined value $\delta$, wherein such adjustment is controlled by at least one computer.

BRIEF DESCRIPTION OF THE FIGURES

The present invention will be more clearly understood from the following description of preferred embodiments of the present invention, taken together with the following drawings, in which the same reference numbers are used to designate the same or similar features. The drawings comprise.

DESCRIPTION OF PREFERRED EMBODIMENTS

I. Definitions

Figure 1:
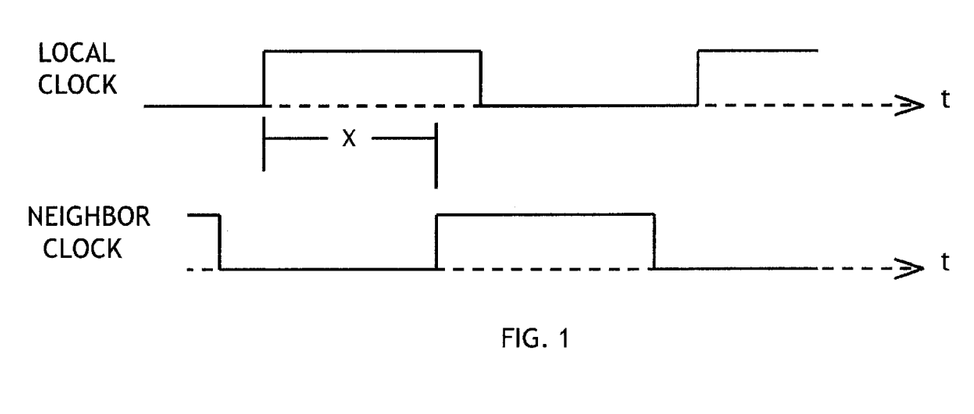
FIG. 1 shows a pair of clocks, useful in understanding the invention.
Figure 2:
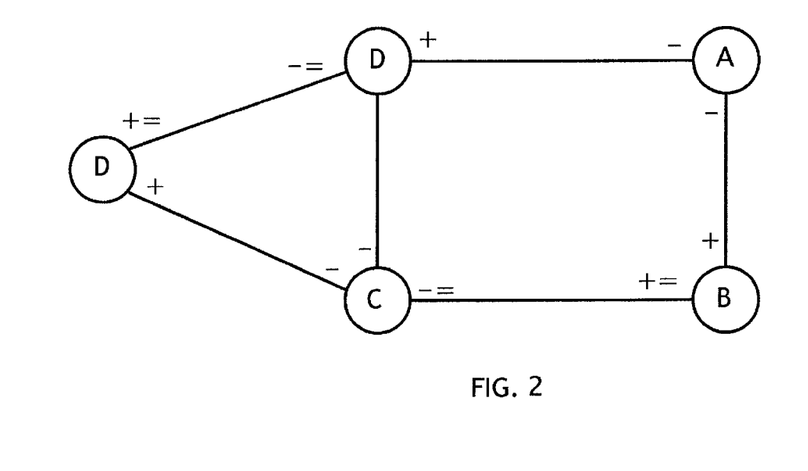
FIG. 2 is a graph representative of a network, in accordance with a preferred embodiment of the invention.

Referring to FIGS. 1 and 2, FIG. 1 shows two clocks of two (neighboring) processors, for example, processors A and B of a network 6, which also includes processors C, D and E. A phase difference, "x", between the processors is measured between the rise of the clocks. The phase difference is measured here as a time interval. Let "T" be the period of the clock. We say that the phase of processor A precedes that of processor B if $0<x\leq T/2$; the phase of A lags that of if $T/2<x<T$. If $x=0$ A and B have the same phase.

$\delta$ denotes the allowed phase difference between neighboring processors. I.e., $\delta$ is the maximum phase difference at which the neighbors can communicate synchronously.

FIG. 2 is an example of a graph describing a network of computers. The marking on each branch describes the phase difference between the neighboring processors on both sides of the branch. For any two nodes (processors) (a, b) connected by a branch let $\phi(a,b)$ denote the phase difference between a and b. Note that $\phi(a,b)=-\phi(b,a)$.

If $\phi(a,b)>\delta$, the a side of the branch is marked with a plus (+) and the b side is marked with a minus (−).

If $\delta>\phi(a,b)>0$ the a side of the branch is marked with plus equal (+=) and the b side is marked with a minus equal (−=).

If $\phi(a,b)=0$ one side of the branch connecting a and b is marked with plus equal (+=) and the other with minus equal (−=). Which side gets which marking is not relevant to the discussion or the algorithm.

A network is generally said to be in a phase synchronous state when, for all neighbors, $|\phi(a,b)|<\delta$.

It should be understood that for networks that have loops (as that shown in FIG. 2), the phase synchronization can be achieved without meeting an additional desired condition, which is referred to herein as cycle synchronization. This requirement is that the sum of the phase differences in any loop be less than T.

A lack of cycle synchronization is generally unacceptable for some of the uses of synchronized systems. In preferred embodiments of the invention the network as a whole executes parallel algorithms where all processors execute suitable program parts. For synchronous communication the reading processor has to read the information at a given clock cycle after the information has been sent by the writing processor. If the phase difference is small but the instructions are off by one or more cycles—synchronous communication cannot function, since there can not be any instruction synchronization around the loop. Therefore, it is most desirable to control both the phase differences (phase synchronization) and the match of the clock cycles (cycle synchronization).

Consider the sum of all phase difference around an arbitrary loop in the network. This sun can be either 0, T, 2T, etc. When the sum is not zero (i.e., cycle synchronization is not achieved) the loop is said to have a cycle jump.

Assume that all processors are equipped with a cycle counter and that all are started simultaneously with the cycle counters zeroed. The network is said to be in a synchronous cycle state if it is in synchronous clock state and, for any pair of neighbors, the cycle counters of the pair are equal at all times, within the allowed phase difference interval δ. Clearly, a network is in synchronous cycle state if it is in synchronous clock state and none of its loops has a cycle jump. However, it can be in a synchronous cycle state even if it is not phase synchronous.

II. General Outline of the Method

In a preferred implementation of the invention, in a general network of processors which may contain loops:

i. If there exists a virtual clock having a phase, such that the phase difference between it and any other clock in the network is within ±T/4, then the algorithm described in section III reduces the phase difference between any pair of neighbors to less than δ.

ii. Given any distribution of phase differences, the algorithm of section IV reduces the phase differences to within ±T/4.

Figure 3:
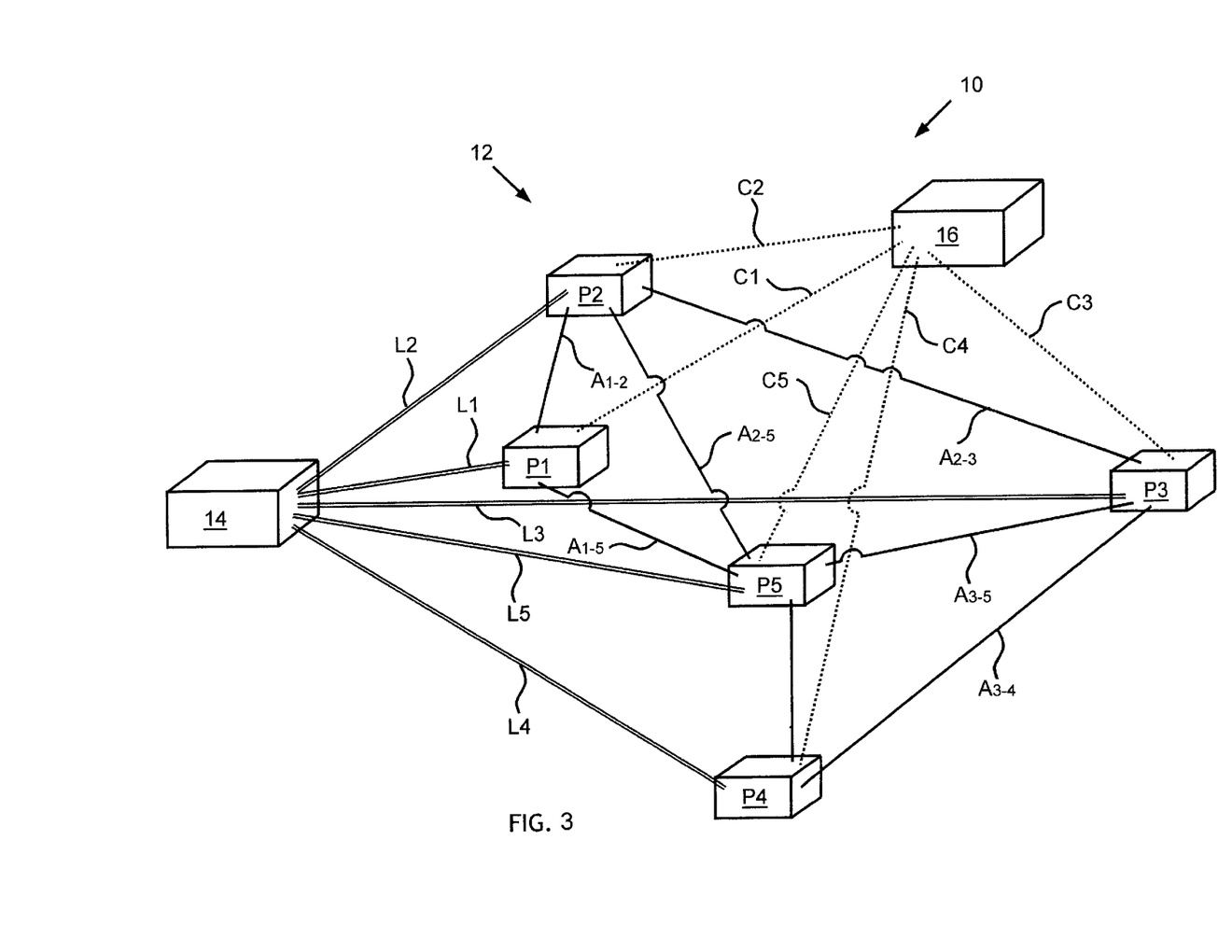
FIG. 3 schematically illustrates the main elements of a processing system, in accordance with a preferred embodiment of the invention.

FIG. 3 schematically illustrates the main elements of a processing system 10, in accordance with a preferred embodiment of the invention. Processing system 10 includes a network 12 composed of a number of processors generally designated P (P1–P5 in FIG. 3). The processors are connected by transmission links denoted A n-m where n and m are the indexes of the processors P. Each of the processors P are preferably connected to a host computer 14, via a cable denoted L–n (where n is the index of the processor). A function of host computer 14 is to control the operation of processors P. A central oscillator 16 supplies each of processors P with a clock signal via cables C–n (where n is the index of the processor). Each of the processors includes clock delay circuitry and phase comparison circuitry as described below. Each processor is capable of generating (and utilizing) a clock at the frequency that it receives from central oscillator 16 with a controllable phase. Each processor is also preferably capable of measuring a phase difference between signals that it receives from its neighbors and reporting the measured phase to host computer. Each processor P is capable of performing an independent application program that is part of the parallel operation of the program. I.e., the processors perform a single program in a synchronous manner.

It should be noted that both FIGS. 2 and 3 are graph network representations and do not necessarily represent the physical structure of the network. In particular, a port of a processor may be connected to one or more different processors and this connection may be a serial connection in which the signal reaches one of the other processors before it reaches the other. In preferred embodiments of the invention, the data signals are made long enough so that all the processors which receive the data signal can read the signal at the same clock cycle. This helps to preserve the instruction synchronism of the processing system and make it relatively independent of the exact placement of the processors.

Furthermore, in preferred embodiments of the invention, the delay lengths of the cables connecting the processors are known. This facilitates the measurements of actual phase differences between the processors in the method described below.

III. Bringing the Network to a Synchronous Clocks State

The following algorithm acts on a network, such as network 12, which has no loops with cycle-jumps. Given the tolerance δ, the algorithm modifies the phases of the clocks, a clock at a time, by introducing an increment in the delay (phase shift) of ±d, d≧δ until the network is in a phase synchronization state, i.e., all phase differences between neighbors are within ±δ. d is usually taken close to δ, e.g., d=0.9δ. Other lower or higher values may be used.

The algorithm is executed serially by host computer 14. The host computer is a workstation that controls the computer network and provides it with services such as I/O, file system, debugging, etc. It communicates with each processor using links L, which may be slow communication links. Alternatively, the algorithm can be executed on one of the processors in the network.

In the following algorithm whenever the phase of the clock of a node is reduced or increased by ±d, the marking on the branches adjacent to the node are adjusted according to the new value of the node.

Let the network have N nodes denoted by i, i=1, . . . ,N.

Algorithm 1

Figure 4:
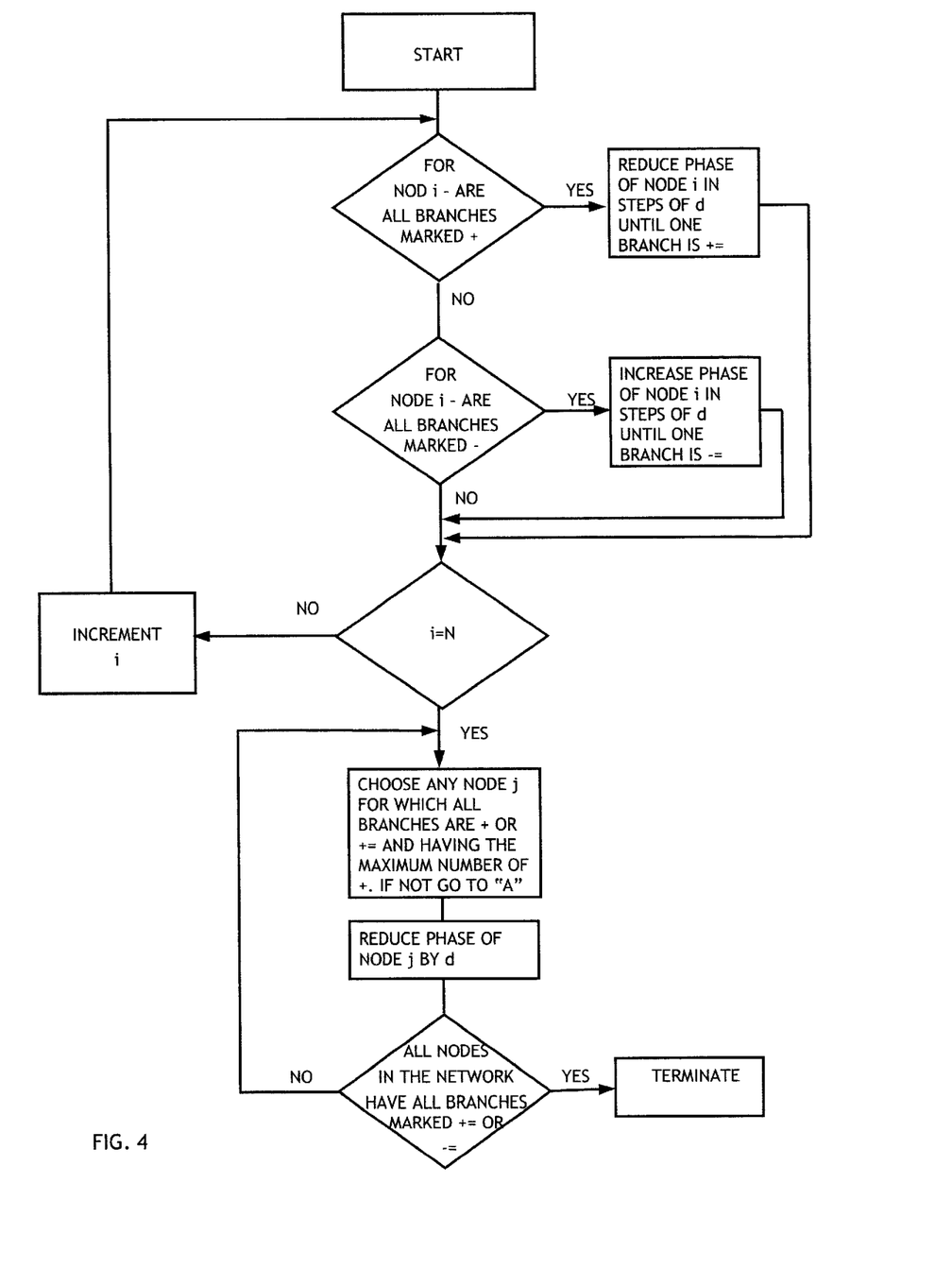
FIG. 4 is a flow chart of an algorithm for reducing each of the phase differences between adjacent processors to below a given value, in accordance with a preferred embodiment of the invention.
Figure 5:
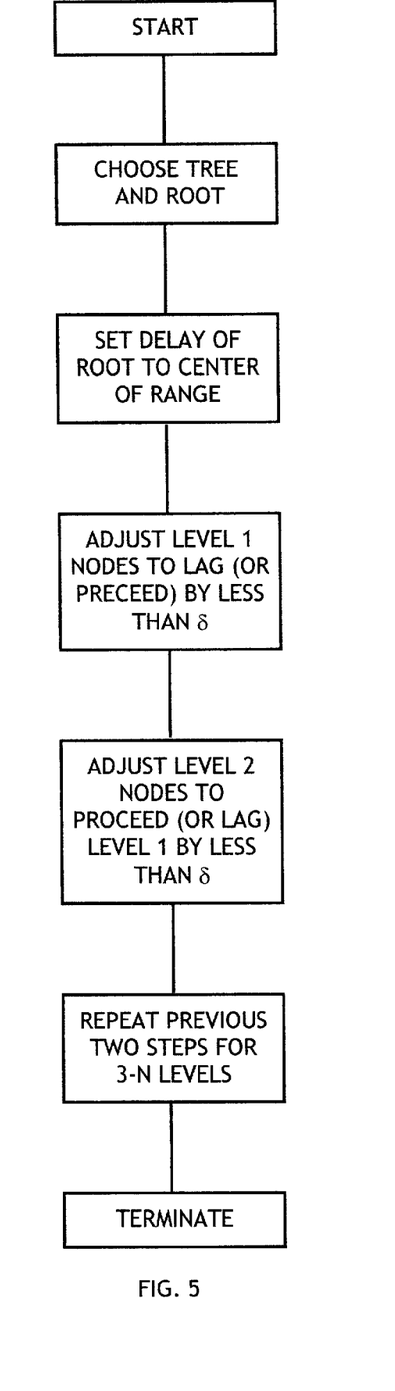
FIG. 5 is a flow chart of an algorithm for bringing the network to a synchronous state, in accordance with a preferred embodiment of the invention.

Step 1: for node i=1 , . . . ,N do {
  (a): If all branches adjacent to node i are marked +, reduce the phase of node i in steps of d until at least one of the adjacent branch marking changes to +=;
  (b): If all branches adjacent to i are marked −, increase the phase of node i in steps of d until at least one of the adjacent branch marking changes to −=;
}
Step 2: Choose any node j satisfying:
  (a): all adjacent branches are marked +or +=, and
  (b): j has the maximum number of +s among all nodes satisfying (a) above;
Reduce the phase of j by d.
Step 3: If for every node j in the network, all adjacent branches to j are marked += or −=, terminate; otherwise, goto Step 2.

This algorithm is outlined in the flow chart of FIG. 4.

Given a computation network; a tolerance δ and equal frequency clocks satisfying the condition that no loop of the network has a cycle jump; the above algorithm brings the network to a synchronous clocks state, i.e., all phase difference between neighbors are smaller than the tolerance δ.

IV. Bringing the Network to a Synchronous Cycle State

This section presents an algorithm that accept a network with arbitrary phase differences between neighbors and by adjusting the phase differences produces a network with no cycle jump in any of its loops.

Let the network be the same network as above, with the same indexing as above. Assume that there exists some reference clock (such as clock 16) with respect to which all phase difference can be measured. Associate this clock with the virtual processor $P_o$ and denote the phase difference $\phi(P_i, P_o)$ by $\Delta_i$.

If for all processors $P_i$ in the network $\Delta_i$ satisfies $-T/4 \leq \Delta_i \leq T/4$, then no loop of the network has a cycle jump. This fact plays a major role in the algorithm. If a network can be brought to satisfy the condition that $-T/4 \leq \Delta_i \leq T/4$, then the algorithm of section III can be used to bring it to a synchronous cycle state, i.e., the network is both in both synchronous clock and cycle states.

Typically, each processor $P_i$ is equipped with a clock divider and a clock delay circuit having a given delay range. The clock divider receives the central clock from source 16 as an input and produces a clock whose period is $2^n$ times the computer clock period, where n is an integer controlled by host computer 14. The divided clock is termed the slow clock and the computer clock is termed the fast clock. The differences in phase of the slow clocks of neighbor-processors is measured and used by the algorithm below.

The frequency division involves a certain delay. Denote by $\epsilon_i$, the delay introduced by the frequency division of processor Pi. While the are $\epsilon_i$s are essentially equal, it is useful to define $\Delta ij = \epsilon_i - \epsilon_j$.

Algorithm 2

A tree algorithm for initial phase adjustment is:
a. Choose a spanning tree of the network and let node (processor) $P_o$ be the root of the tree. Preferably, the tree to be chosen has a minimum height among possible spanning trees.
b. Adjust the clock delay circuit of $P_o$ to the middle of its range and consider its clock to be the reference clock.
c. Consider the neighbors of $P_o$ to be its descendants or nodes of level 1. Adjust the clocks of these nodes to lag after the clock of $P_o$ by less than $\delta$.
d. Consider those neighbors of nodes of level 1 which their decendants to be nodes of level 2. Adjust the clocks of these nodes to precede the clocks of their ancestors by less than $\delta$.
e. Continue the adjustment of the clock phases in the above manner (lags—precedes-lags-etc.) until the tree leaves are met and all nodes have their clock phases adjusted.

The above algorithm is performed on the network with the slow clock that has a period of $2^n T$, T being the period of the fast clock. The number n must be chosen such that the slow clock network after algorithm 2 satisfies the conditions satisfy the condition that $-T/4 \leq \Delta_i \leq T/4$.

If L denote the height of the tree—the maximum length of the paths from the root to the leaves. The longest loop (which does not contain additional loops within it) has length 2L+1. The sum of the phase differences along the longest loop (summing the phase differences with their sign) is equal or smaller than $(L+1)\delta$. To satisfy the conditions the slow clock network has to satisfy:

$$(L+1)\delta \leq (T/4)*2^n = T*2^{n-1} \quad \text{or} \quad n > 1 + \ln\frac{(L+1)\delta}{T}. \quad (1)$$

Note that the choice of a tree with the smallest L can be performed by finding the shortest distances between any two nodes in the network and then choosing the root as the node for which the maximum of these distances is minimal.

V. The Complete Algorithm

The following is the full clock synchronization algorithm.

Algorithm 3

Step 1: Choose a root and a tree of the network; determine the exponent n from equation 1.
Step 2: Slow the clock by $2^n$; apply algorithm 2 to the chosen tree.
Step 3: Apply algorithm 1 to the result of the above step 2 to reduce the phase shift below $\delta$.
Note that the clock is the slow clock.
Step 4: Return to the fast clock; apply algorithm 1.
Step 5: Terminate.

After performing step 3, the (time of the) phase delay is less than $\delta$. When the clock is speeded up (step 4) the delay should be preserved and no additional application of algorithm 1 should be necessary. However, due to the effect of the sum of the $\epsilon$s, an additional correction using the fast clock is generally necessary.

Theorem

If all loops of the network satisfy $-T/4 \leq \Sigma_{along\ the\ loop} \Delta \epsilon_{ij} \leq T/4$, then algorithm 3 reduces the network to a synchronous cycle state corresponding to $\delta$, i.e., to a synchronous clock state and all loops have no cycle jump.

Proof: As a result of the choice of n in Step 1, after Step 2 the network with the slow clock satisfies the condition that $-T/4 \leq \Delta_i \leq T/4$ and therefore it does not have loops with cycle-jumps. Therefore, the application of algorithm 1 reduces the slow clock network to a clock synchronization state, i.e., for any pair of processors $\Delta_{ij} < \delta$, and for any loop $\Sigma_{along\ the\ loop} \Delta_{ij} = 0$.

As a result of the differences in the values of the $\epsilon_i$s, the change in clock period (Step 4) makes the phase difference between $P_i$ and $P_j$ to $\Delta \epsilon_{ij}$. Since $\Sigma_{along\ the\ loop} \Delta \epsilon_{ij} = 0$, the theorem condition implies that after the return to the fast clock the condition $-T/4 \leq \Delta_{ij} \leq T/4$ is satisfied and the network contains no cycle-jumps. Therefore, Step 4 reduces the fast-clock network to a clock synchronization state with no cycle-jumps. QED.

VI. Implementation of the Synchronization Circuits

This section presents one exemplary design of the synchronization circuits. Since each processor has to have these circuits preferably the circuits are implemented as integrated circuits. It should be understood that the method of the invention can be implemented on other circuitry and that the following implementation is presented mainly in order to present the best mode for carrying out the invention.

VI. 1 Typical Specification

The circuit has the following typical specification:
a. Clock frequency between 20 MHz to 40 MHz (clock period of 25 nsec to 50 nsec).
b. The circuit is able to introduce phase shifts (delay) larger than the clock period. The delay is introduced in constant steps of d each. In this exemplary design $\delta$ is 1 nsec. A RESET command sets the delay to the middle of the delay range.
c. The circuit enables the comparison of its own processor clock with the clocks of neighboring processors.
d. The slow clock is obtained by dividing the clock, for example, by 8. The slow clock is 'synchronized' with the processor clock.
e. Input lines:
   Main clock;
   'Up' and 'down' to add or reduce a delay of d;
   'Reset' fixes the delay to the middle of the delay range;
   'Reset-slow' zeroes the delay of the slow clock;
   Clock of the neighbor processor.
f. Output lines
   The delayed main clock;
   The slow clock;
   Two lines showing the clock comparison result; one line indicates which clock precedes/lags; the second line shows whether the difference between clocks is larger then $\delta$.

VI. 2 Typical Processor Implementation

Figure 6:
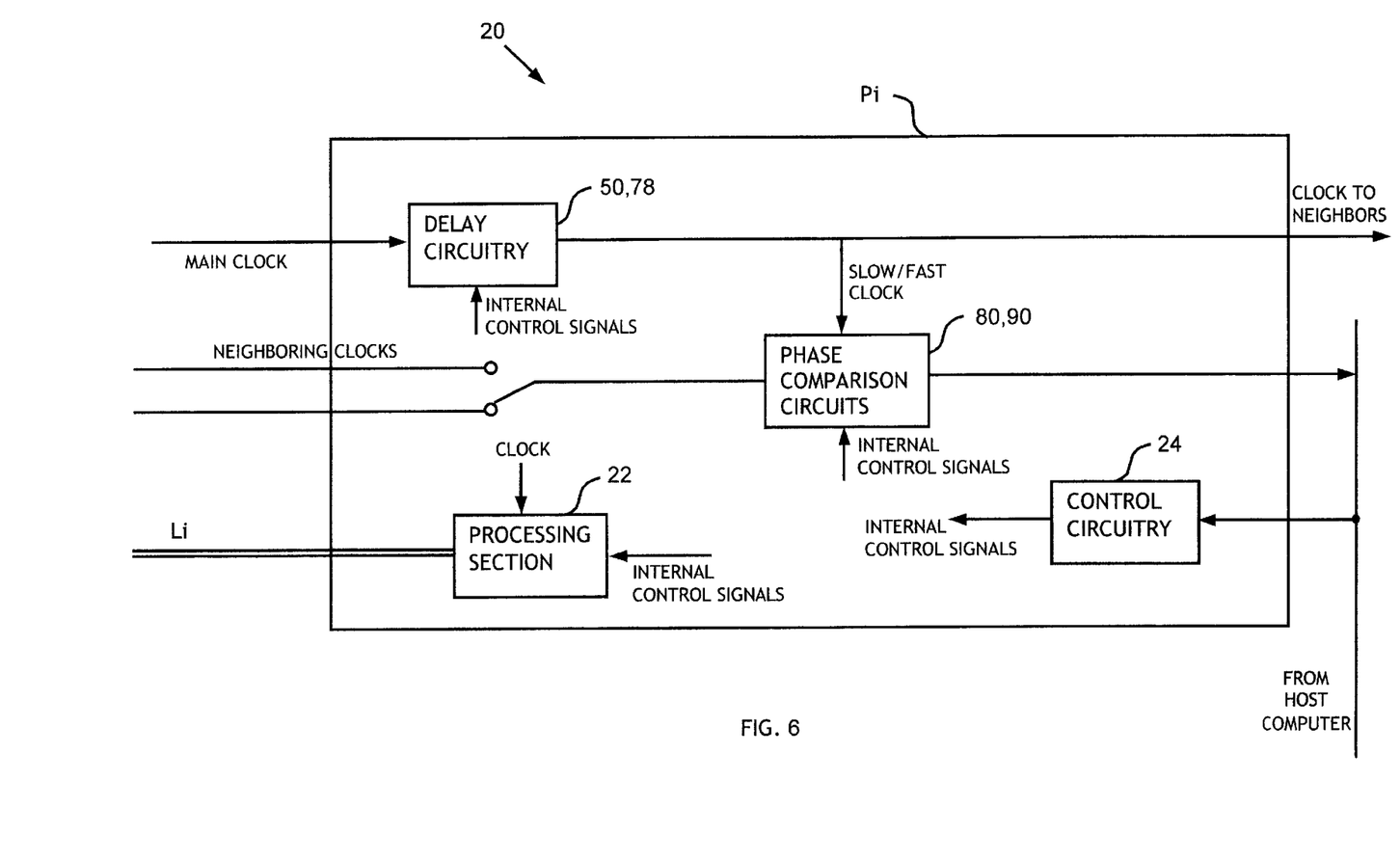
FIG. 6 is a circuit-block diagram of a processor, with phase comparison circuitry, in accordance with preferred embodiment of the invention.

FIG. 6 is a block diagram of a typical processor 20 (Pi), in accordance with a preferred embodiment of the invention. Processor 20 includes delay circuitry that receives the main clock, delays it and provides a delayed and optionally lower frequency clock as an output to neighboring processors and a local processing section 22. The delay in the delay circuit is preferably controlled by internal control signals generated by control circuitry 24 based on signals received from the host computer. The delay circuitry is described in greater detail with respect to FIGS. 7–9.

The delayed (and optionally divided) clock is transferred to the neighbors of the processor and also to phase comparison circuits 80, 90 which determine the phase difference between the delayed clock and the clocks of the neighboring processors. The results of this analysis are sent to the host computer. Details of this circuitry is described below with reference to FIGS. 10–12.

Processing section is the portion of processor 20 that actually runs the portion of the parallel program assigned to the processor. In practice, control circuitry 24 and processing circuitry may be a single microprocessor. Alternatively, processing section 22 may include dedicated hardware for performing certain common tasks.

VI. 3 Delay Circuitry

Figure 7:
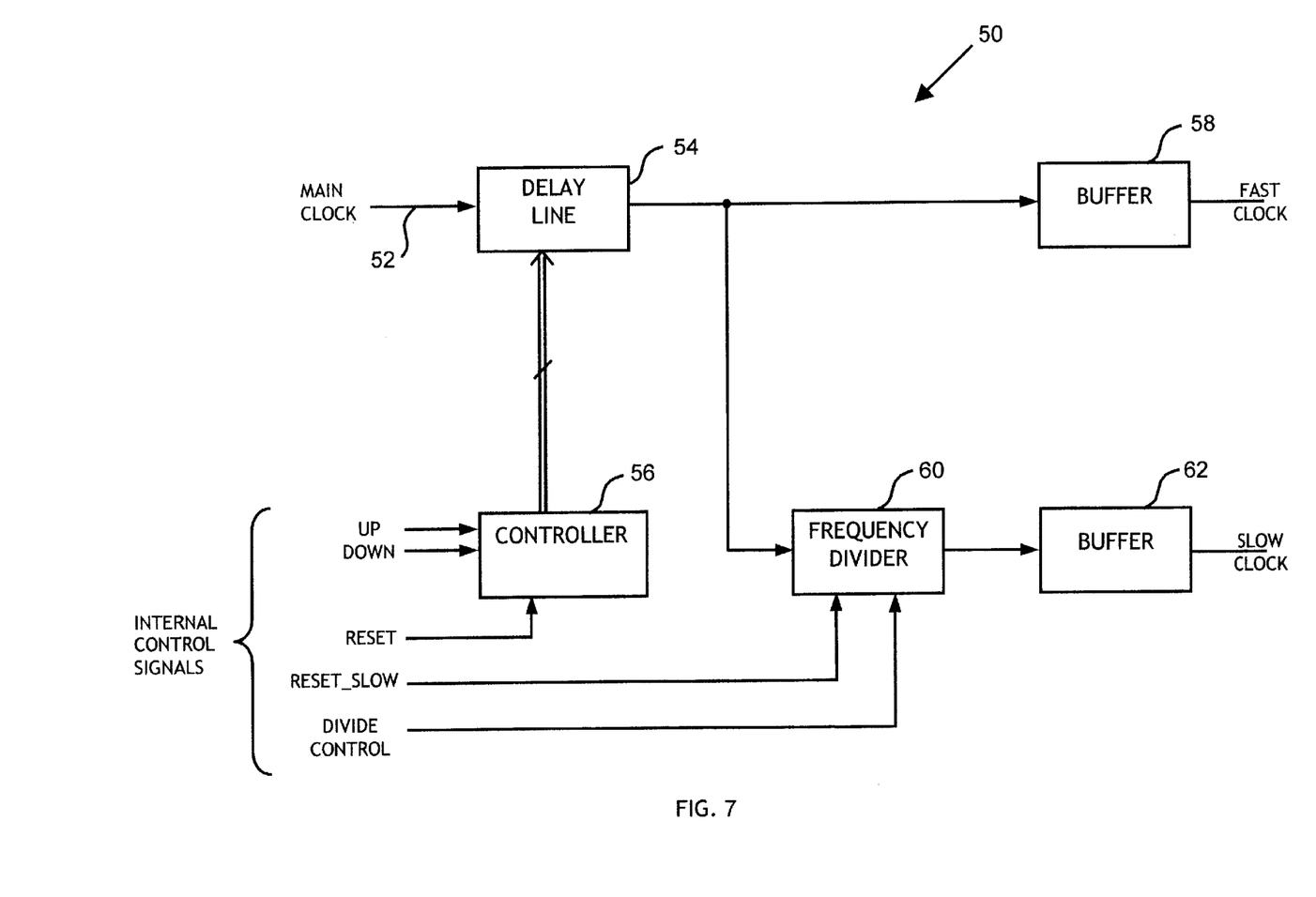
FIG. 7 is a block diagram of delay and frequency divider circuits, in accordance with a preferred embodiment of the invention.

FIG. 7 is a block diagram of a clock delay circuit 50 that provides for clock delay and generation of the slow clock. The main clock enters the delay circuit at an input port 52. Input port 52 passes the clock to a delay line 54. In one embodiment of the invention, the delay line has 92 cells (as described below with respect to FIG. 8). The delay is controlled by a controller 56 with three command lines, 'up', 'down' and 'reset'. Further details of the control of the delay is described below with respect to FIG. 9.

The output of delay line 54 passes through a buffer 58 to become the (fast) processor clock. A frequency divider circuit 60 receives the delayed main clock and produces the slow clock which is fed out of circuit 50 via a second output buffer 62.

Figure 8:
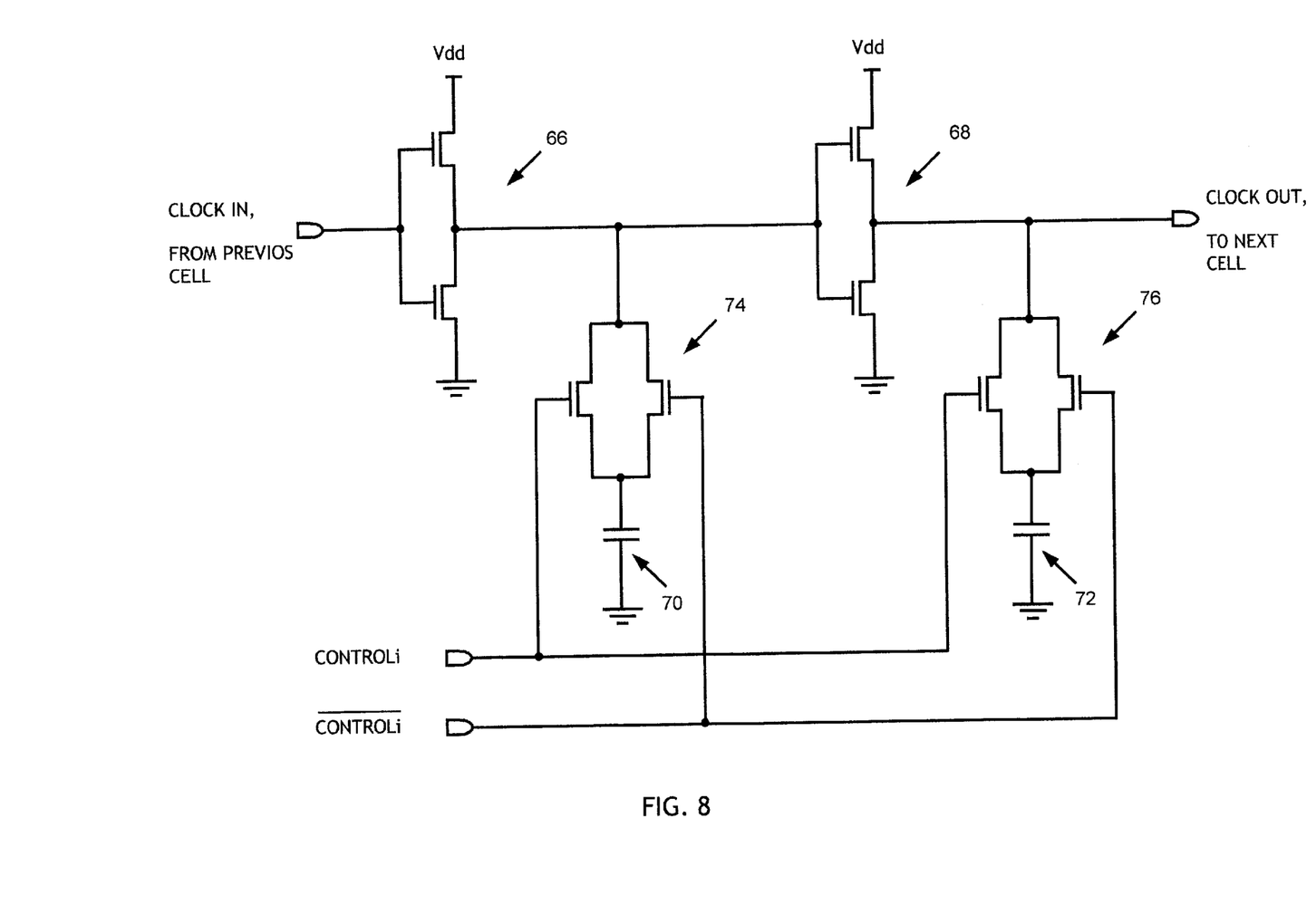
FIG. 8 is a cell of the delay line circuit, in accordance with a preferred embodiment of the invention.

Delay circuit 50 is built out of a number of cells 64 connected in series. A preferred embodiment of one cell 64 is shown in FIG. 8. Each cell 64 comprises two inverters 66 and 68. A capacitive load (70, 72) is connected to each inverter through a gate (74, 76). The capacitive load increases the delay of the inverter. The use of two inverters per cell causes equal delay for the rise and fall of the input signal. The input control inserts the capacitance into the circuit. Typically, when load capacitors of 0.1 pF are connected the cell delay is increased by 0.7 nsec. Thus, the 92 cells can produce a delay variation of 64 nsec. It should be understood that the exact delay will depend on the transistor dimensions and type.

Figure 9:
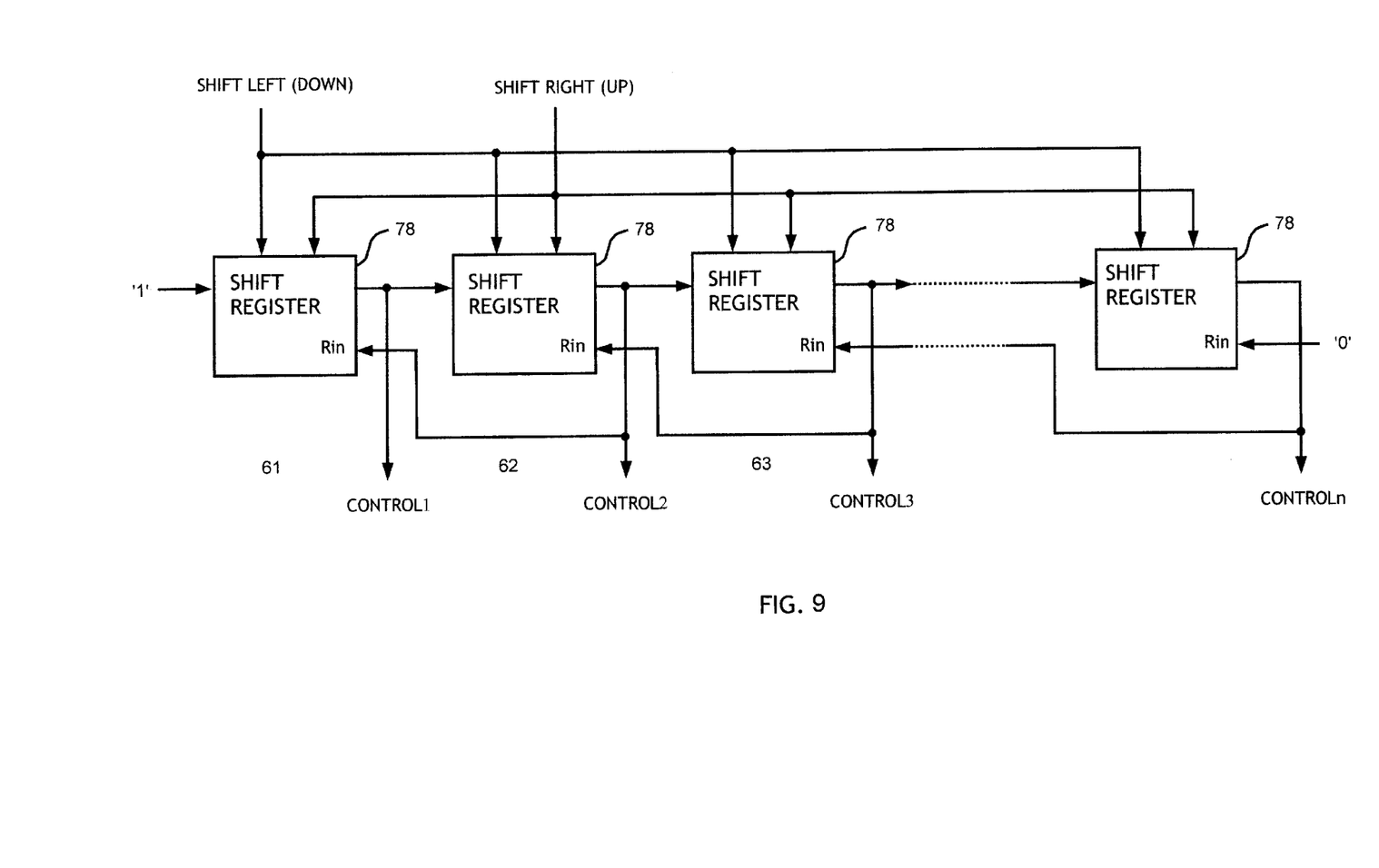
FIG. 9 is a block diagram of a delay line circuit with a controlling shift register, in accordance with a preferred embodiment of the invention.

Delay circuit control is performed by a 92 cell bidirectional shift register, each cell of which is denoted by reference 78 as shown in FIG. 9. Each register bit controls one cell of the delay circuit; "1" connects/increases the capacitor and increases the cells delay; "0" disconnects/decreases the capacitor and thus decreases the delay. 'Reset' (not shown) sets the first 36 cells to one and the rest to zero; thus, the delay is in the middle of its range. A request to increase the delay (Up) causes a shift right with 1 entering from the left; thus, the delay is increased by one-cell-delay. A 'down' request causes a shift left, with a decrease in delay.

The slow clock is obtained by frequency division. The phase of the fast clock and the derived slow clock are related. If one clock rise of the fast clock lags after a rise of the slow clock by less than 0.2δ (or some other predetermined small value) the two clocks of different frequency are 'synchronized'.

A basic design divides the clock by 8—a fixed quantity. This number defines the largest number of processors that can participate in algorithm 3. The condition of equation 1, with delay of ε is thus $$\delta(L+1)+\epsilon(L+1) \leq (T/2)*2^n$$

With $2^n=8$, a minimum clock period T=25 nsec, δ=1 nsec, ε=0.2 nsec, the height of the maximum spanning tree for which synchronization can be performed by the slow clock is L<70.6. This corresponds to a loop of 140 processors. If a network with a larger loop is to be synchronized, a larger n must be provided. This option is shown in FIG. 7.

VI. 4 Phase Comparison Circuit

Figure 10:
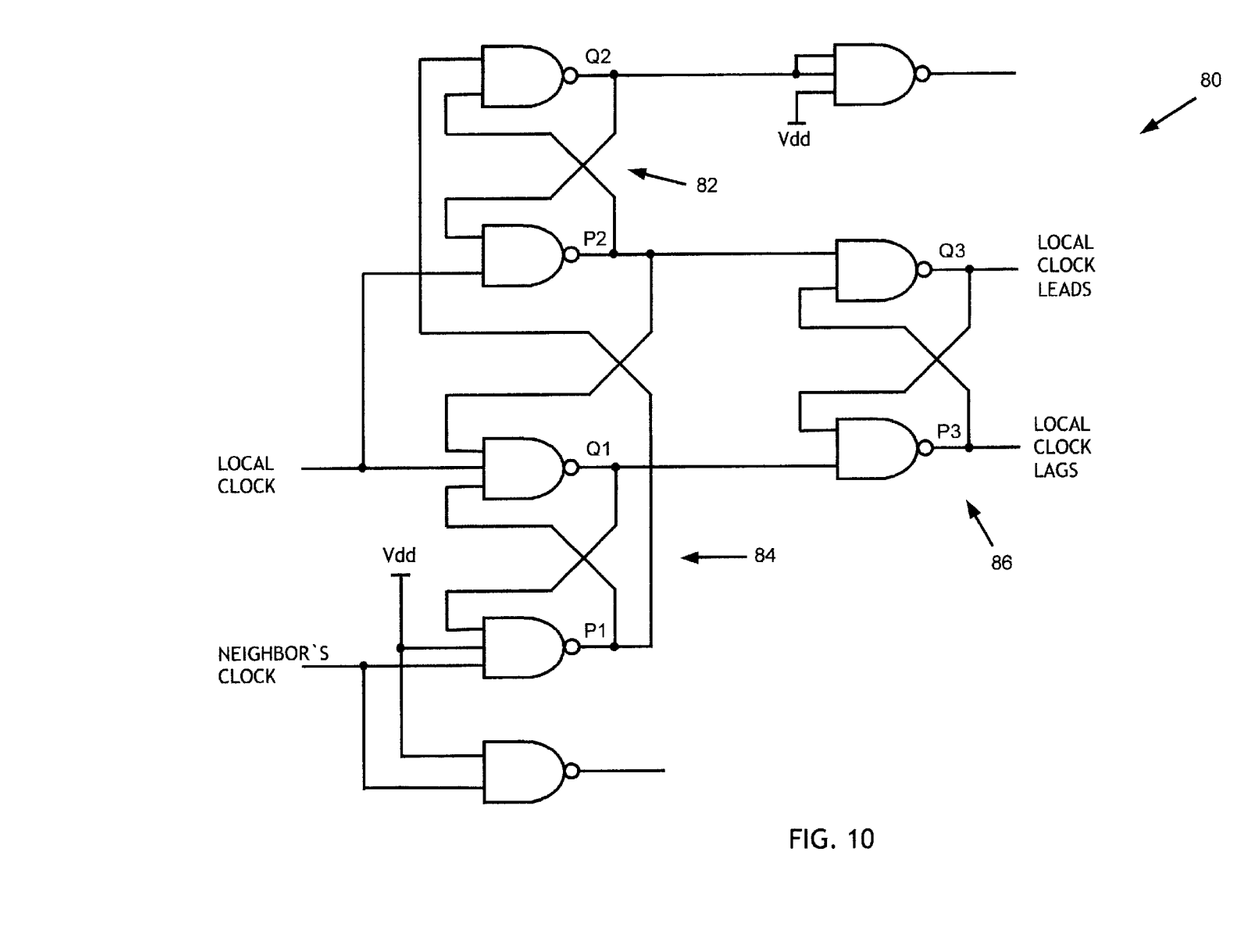
FIG. 10 is a circuit diagram of a two clock phase comparator, in accordance with a preferred embodiment of the invention.
Figure 11:
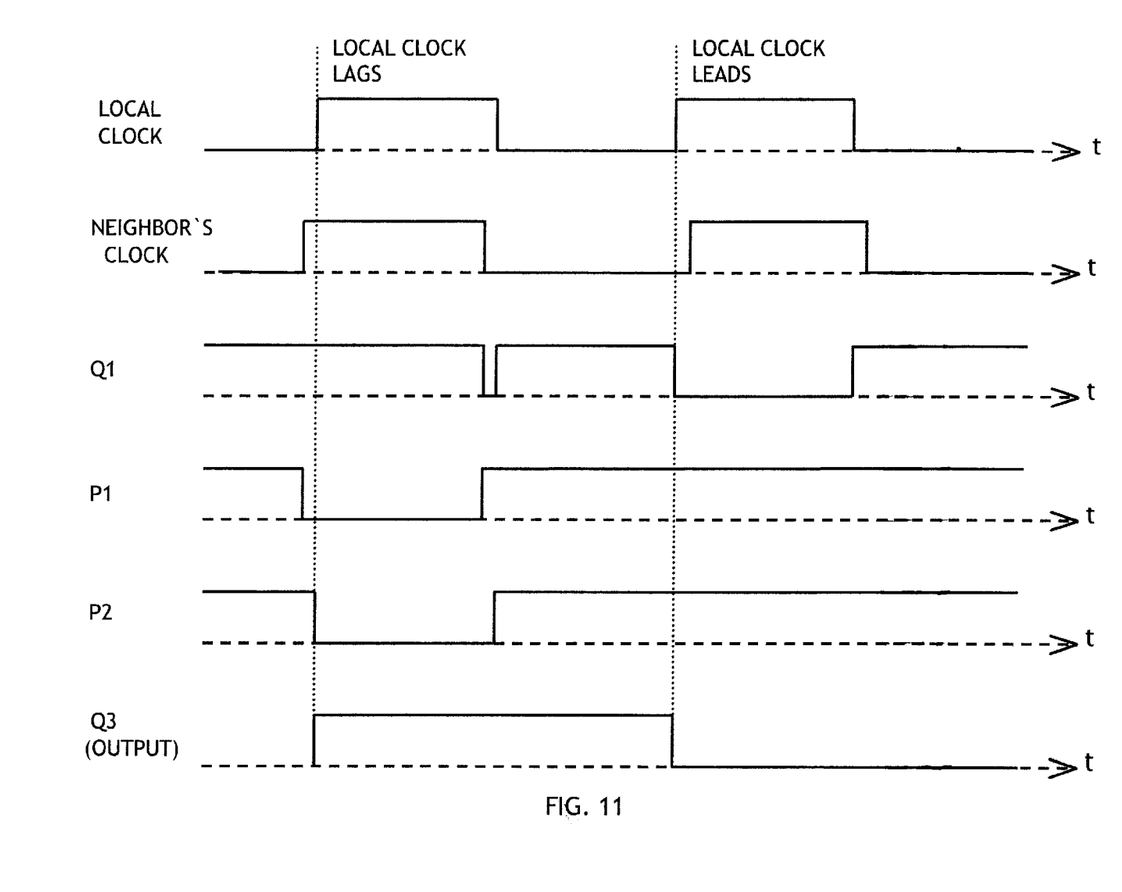
FIG. 11 is a timing diagram of the phase comparator of FIG. 10, in accordance with a preferred embodiment of the invention.

FIGS. 10 and 11 show a two clock phase comparator 80 and a timing diagram of the circuit. Phase comparison circuit 80 receives its own processor's clock from the output of the delay circuit and a clock of a neighboring processor. It compares the rise times of the two clocks and determines and indicates which clock precedes and which clock lags. Furthermore, it determines whether the time difference between the two rise times is smaller or larger than δ.

The design follows M. Johnson, et al., "A Variable Delay Line PLL for CPU-Coprocessor Synchronization" IEEE J of Solid State Circuits, Vol. 23, no. 5, October 1988, the contents of which are incorporated herein by reference. Further details on operation can be found in that paper. In principle, such a comparator is just a edge-triggered D flip-flop with its clock and data entries connected to the clocks to be compared. If data='0' at the rise of the clock, the output Q='0'; If data='1' at the rise of the clock, the output Q='1'.

In practice, the circuit consists of three flip-flops 82, 84 and 86 of nand gates. This implementation has the advantage that the two clock signals pass through equal paths and thus, additional phase delays are avoided. Two gates are added to balance the loads on the clock circuits. Nand gates are preferably used since they have a short setup plus hold time as compared with a standard D flip-flop.

FIG. 11 shows a timing diagram that explains the circuit behavior for two states, namely local clock lags and local clock leads. Although shown on a common time line for convenience, the two states would not normally appear as shown on a time line.

VI. 5 Comparing the Clock Phase Difference with δ

Figure 12:
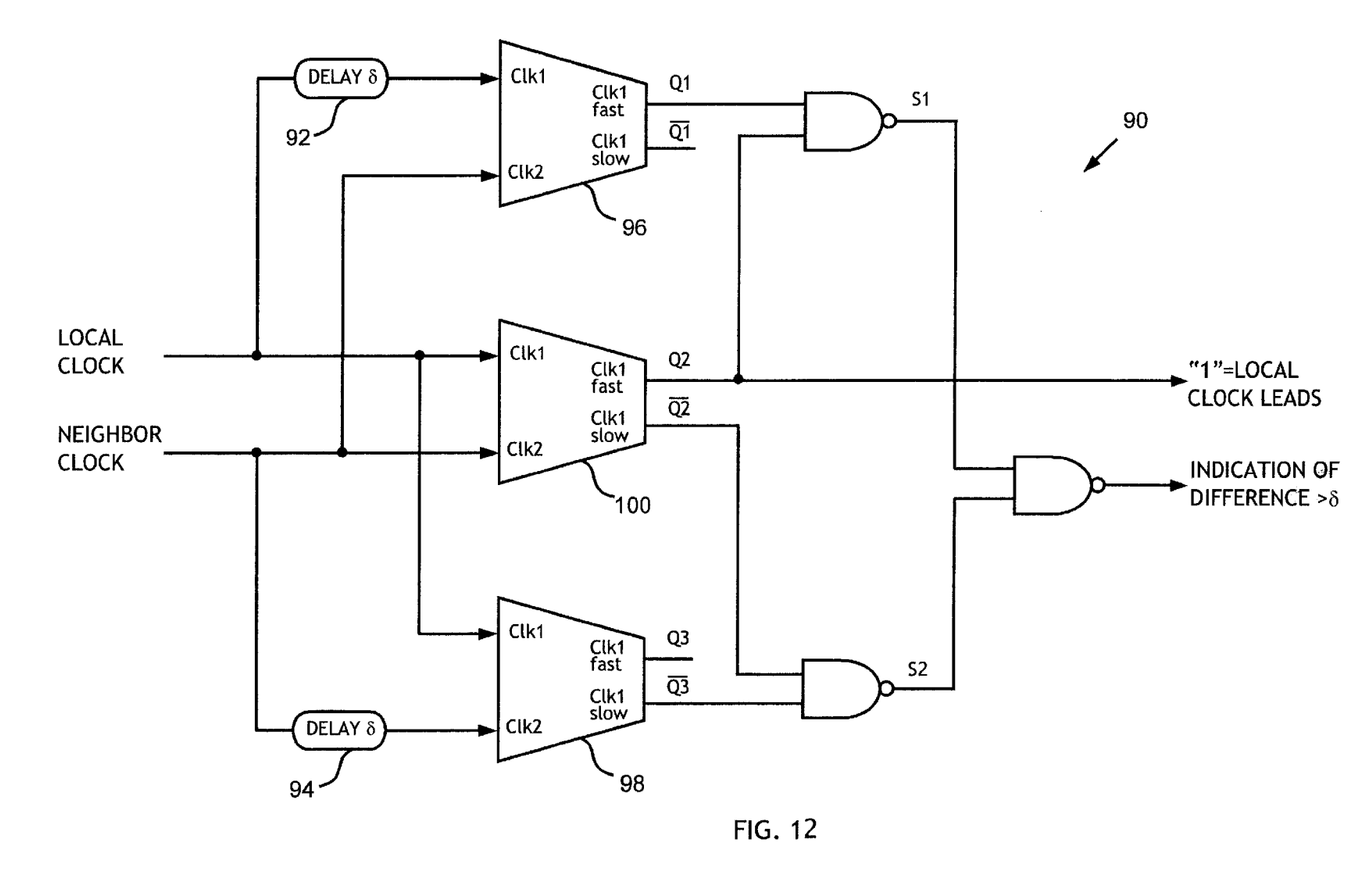
FIG. 12 is a phase comparison circuit with a $\delta$ difference test, in accordance with a preferred embodiment of the invention.

FIG. 12 shows a phase comparison circuit 90 with a δ difference test, in accordance with a preferred embodiment of the invention. Each of the local and neighbor clocks is passed through a cell of a δ delay (92, 94) and is compared with the undelayed other output clock in one of two comparators (96, 98). The undelayed clocks are also compared, in a comparator 100. Elements 96, 98 and 100 each correspond to element 80 of FIG, 10. The phase difference between the two clocks is larger than δ if one of the following conditions is satisfied:

a. Clock A rises before clock B and the δ-delayed A clock rises before B;

b. Clock B rises before clock A and the δ delayed B clock rises before B.

Otherwise, the phase difference is smaller than δ.

δ which is set for 1 nsec, has to be larger than the delay of a single cell of the 92 cell delay circuit (d=0.7 nsec). That relation has to hold when temperature, voltage, etc. change. The two circuits are constructed out of the same components and, therefore, δ remains larger than d when the above parameters change.

It will be understood that the details of the algorithms and apparatus are provided for exemplary purposes only. In particular, other apparatus for providing the functions of the processors and various algorithms for producing the effects of the disclosed algorithms will occur to persons of skill in the art. Similarly, some details shown in the embodiments, while preferred, are not essential and some preferred embodiments of the invention may omit them.

As used herein, the terms "have", "include" and "comprise" or their conjugates, as used herein mean "including but not limited to".

What is claimed is:

1. A method of synchronizing a general network of processors, which network may contain loops, the method comprising:

(a) providing a clock signal at each of the processors, said clock signal having a common frequency and different phases;

(b) measuring the phase between clock signals of adjacent processors at the processors;

(c) adjusting the phase of the clock signals to produce local clock signals at each processor by locally varying the phases of the individual clock signals, responsive to the measurement, such that phase differences between the clock signals of adjacent processors are less than a predetermined amount.

2. A method according to claim 1 wherein the determination of the phase differences is made by a measurement at the processors.

3. A method according to claim 1 wherein the phases of the individual clock signals for the processors are varied by their associated processors.

4. A method according to claim 1 wherein the clock signal is provided to the processors from a remote clock source via transmission lines of different lengths, such that the phase of the provided clock signals at an input to the processors is different for at least some of the different processors.

5. A method according to claim 1 wherein the phase measurements are transmitted to a computer and wherein the computer determines required phase changes for the processors in accordance with a predetermined protocol.

6. A method according to claim 5 wherein the protocol comprises:

A) determining, for a first processor, whether the phase difference between its local clock and the clocks of all its neighboring processors is greater than $\delta$ in a same sense, when measured at the first processor;

B) if it is, then stepwise varying the phase at the first processor by an amount less than $\delta$, in a direction to reduce the phase differences, until at least one phase difference between the first processor and a neighbor, measured at the first processor, is less than $\delta$; and C) repeating A) and B) for all the processors.

7. A method according to claim 6 comprising, after C:

D) determining the processor (i) for which measurements of all the neighboring clocks differ from the local clock in a particular same sense and (ii) which has the most deviations in that sense that are greater than $\delta$;

E) changing the phase by an amount smaller than $\delta$, in an amount to reduce the maximum measured phase difference; and F) repeating D) and E) until all measured phase differences for all the pairs of neighboring processors is less than $\delta$.

8. A method according to claim 5 wherein the computer informs the processors of a required phase change in accordance with the protocol and wherein the processors vary the phase responsive to the informing.

9. A method according to claim 1 and including, prior to (a), removing cycle jumps in all loops of the system.

10. A method according to claim 9 wherein removing cycle jumps comprises:

(i) choosing a spanning tree of the network, arranged in hierarchical levels;

(ii) adjusting the phase of the clock signals in a first descendent level of the processors to be different from the clock of a root processor of the network by less than a given amount, in a first time sense;

(iii) adjusting the phase of the clocks in a second descendant level of the processors to be different from the clock of their immediate ancestor by less than the given amount in a second time sense opposite from the first sense;

(iv) repeating (ii) and (iii) for succeeding descendant levels of the processors until the end of the tree is reached.

11. A method according to claim 10 and including:

prior to (i), reducing the frequency of the clock signal; and subsequent to (iv), returning the frequency of the clock signal to its original value.

12. A method according to claim 10 wherein the first time sense is a lag and the second time sense is a lead.

13. A method according to claim 10 wherein the first time sense is a lead and the second time sense is a lag.

14. A method according to claim 1 wherein measuring comprises sending a clock signal from one of said adjacent processors to another of said adjacent processors, for measurement of a difference in phase at said second processor.

15. A method of eliminating phase cycle in a loop connected system, the network comprising processors having a clock with at least a variable phase, the method comprising:

(i) choosing a spanning tree of the network, arranged in hierarchical levels;

(ii) adjusting the phase of the clock signals in a first descendent level of the processors to be different from the clock of a root processor of the network by less than a given amount, in a first time sense;

(iii) adjusting the phase of the clocks in a second descendant level of the processors to be different from the clock of their immediate ancestor by less than the given amount in a second time sense opposite from the first time sense;

(iv) repeating (ii) and (iii) for succeeding descendant levels of the processors until the end of the tree is reached.

16. A method according to claim 15 and including, prior to (i):

reducing the frequency of the clock signals.

17. A method according to claim 16 wherein the first time sense is a lag and the second time sense is a lead.

18. A method according to claim 16 wherein the first sense is a lead and the second time sense is a lag.

19. A method according to claim 15 and including after (iv):

(v) measuring the phase between clocks at the processors; and (vi) locally varying the phases of the individual clock signals, responsive to the measurements, such that phase differences between the clock signals are less than a predetermined value.

20. A method according to claim 19 wherein the first time sense is a lag and the second time sense is a lead.

21. A method according to claim 19 wherein the first time sense is a lead and the second time sense is a lag.

22. A method according to claim 19 and including, after (vi):

(vii) returning the clock signal frequency to its original value;

(viii) performing the method of claim 1.

23. A method of synchronizing a general network of processors, which network may contain loops, the method comprising:

(a) providing clock signals at each of the processors, said clock signals having a common frequency;

(b) measuring the phase between clock signals of different processors at the processors; and (c) adjusting the phase of the clock signals to produce local clock signals at each processor by varying the phases of the clock signals of individual ones of the processors, responsive to the measurements, such that phase differences between the clock signals of adjacent processors are less than a predetermined value 6, wherein such adjustment is controlled by at least one computer.

* * * * *